United States Patent [19]

Mizrahi et al.

[11] Patent Number: 5,625,472
[45] Date of Patent: *Apr. 29, 1997

[54] METHOD FOR FORMING DISTRIBUTED BRAGG REFLECTORS IN OPTICAL MEDIA

[75] Inventors: Victor Mizrahi, Bedminster, N.J.; John E. Sipe, Toronto, Canada

[73] Assignee: Lucent Technologies Inc., Murray Hill, N.J.

[*] Notice: The term of this patent shall not extend beyond the expiration date of Pat. No. 5,309,260.

[21] Appl. No.: 592,245

[22] Filed: Jan. 26, 1996

Related U.S. Application Data

[63] Continuation of Ser. No. 199,366, Feb. 18, 1994, abandoned, which is a continuation-in-part of Ser. No. 995,726, Dec. 23, 1992, Pat. No. 5,309,260.

[51] Int. Cl.$^6$ .................... G02B 6/10; G02B 5/18; G03H 1/00
[52] U.S. Cl. .................... 359/34; 359/569; 385/37
[58] Field of Search .................... 359/34, 566, 569, 359/3; 385/37

[56] References Cited

U.S. PATENT DOCUMENTS

| | | | |
|---|---|---|---|
| 3,728,006 | 4/1973 | Brooks et al. | 350/3.5 |
| 4,093,338 | 6/1978 | Bjorkland et al. | 350/3.7 |
| 4,725,110 | 2/1988 | Glenn et al. | 350/3.61 |
| 4,807,950 | 2/1989 | Glenn et al. | 350/3.61 |
| 4,889,398 | 12/1989 | Elbaum et al. | 350/3.67 |
| 4,983,003 | 1/1991 | Wreede et al. | 350/3.61 |
| 5,007,705 | 4/1991 | Morey et al. | 350/96.29 |
| 5,048,913 | 9/1991 | Glenn et al. | 385/37 |
| 5,128,780 | 7/1992 | Smith | 359/24 |
| 5,195,161 | 3/1993 | Adar et al. | 359/37 |
| 5,210,625 | 5/1993 | Moss et al. | 359/1 |
| 5,237,576 | 8/1993 | DiGiovanni et al. | 372/6 |
| 5,245,404 | 9/1993 | Jannson et al. | 385/37 |
| 5,257,273 | 10/1993 | Farries | 385/37 |
| 5,309,260 | 5/1994 | Mizrahi et al. | 359/569 |
| 5,337,382 | 8/1994 | Mizrahi | 359/569 |
| 5,351,324 | 9/1994 | Forman | 359/34 |
| 5,363,239 | 11/1994 | Mizrahi et al. | 359/569 |

OTHER PUBLICATIONS

G.A. Ball et al., "Continuously Tunable Single–Mode Erbium Fiber Laser," *Optics Lett.*, vol. 17, No. 6, Mar. 15, 1992, pp. 420–422.

H. Kogelnik, "Filter Response of Nonuniform Almost–Periodic Structures," *The Bell System Technical Journal*, vol. 55, No. 1, Jan. 1976, pp. 109–126.

G. Meltz et al., "Bragg Grating Formation and Germanosilicate Fiber Photosensitivity," *SPIE*, vol. 1516, International Workshop on Photoinduced Self–Organization in Optical Fiber, Quebec City, Canada, May 10–11, 1991.

P.K. Tien, "Method of Forming Novel Curved–Line Gratings and Their Use as Reflectors and Resonators in Integrated Optics," *Optics Lett.*, vol. 1, No. 2, Aug. 1977, pp. 64–66.

X. Mai et al., "Simple Versatile Method for Fabricating Guided–Wave Gratings," *Applied Optics*, vol. 24, No. 19, Oct. 1, 1985, pp. 3155–3161.

*Primary Examiner*—Jon W. Henry
*Attorney, Agent, or Firm*—Martin I. Finston; Glen E. Books; Eugen E. Pacher

[57] ABSTRACT

A device for transmitting radiation is provided. The device includes a glass optical waveguide having a core. A Bragg grating is at least partially formed within the core. Associated with the Bragg grating is a transmission spectrum that includes a band in which incident radiation is attenuated, the peak attenuation being at a wavelength $\lambda$. The transmission spectrum of the Bragg grating is such that the full width at half maximum measured in transmission is greater than or equal to (1.5 nm/1558.5 nm) $\lambda$ and peak attenuation within the band is greater than or equal to 90% of full scale transmission. Attenuation exceeds 50% of the peak attenuation everywhere within the full width at half maximum of the transmission spectrum.

12 Claims, 6 Drawing Sheets

METHOD FOR FORMING DISTRIBUTED BRAGG REFLECTORS IN OPTICAL MEDIA

CROSS-REFERENCE TO RELATED APPLICATION

This application is a continuation of application Ser. No. 08/199,366, filed on Feb. 18, 1994, now abandoned, which application is in turn a Continuation-In-Part of application Ser. No. 07/995,726 filed Dec. 23, 1992 and issue as U.S. Pat. No. 5,309,260 on May 5, 1994, which are incorporated herein by reference.

FIELD OF THE INVENTION

This invention pertains to the processing of optical waveguiding articles such as optical fibers, and more specifically to the formation of passive optical components that are integrated with such waveguiding articles, by using actinic radiation to modulate the refractive index.

ART BACKGROUND

Certain optical media, including at least some silica-based optical fibers, can be modified by exposure to electromagnetic radiation in an appropriate spectral range. (Such radiation, typically ultraviolet radiation, is referred to below as "actinic" radiation.) That is, exposure of a photosensitive optical fiber (or other optical medium) to actinic radiation may cause the refractive index to change in the exposed portion of the medium. A periodic pattern can be imposed on the impinging radiation by, e.g., superimposing a pair of beams of substantially monochromatic radiation from, e.g., a laser, to create an interference pattern. When such a patterned radiation field impinges on an optical fiber or other optical waveguide having a core of the appropriate photosensitivity, a corresponding pattern is imposed on the core in the form of periodic (or quasiperiodic) fluctuations in the core refractive index. Such a pattern, which is often referred to as a "Bragg grating" or a "distributed Bragg reflector (DBR)" can behave as a spectrally selective reflector for electromagnetic radiation. Bragg gratings formed in this manner are particularly useful as end-reflectors in optical fiber lasers. These Bragg gratings are useful both because they are spectrally selective, and because they are readily incorporated in the same optical fiber that supports the active laser medium.

A technique for creating these Bragg gratings is described in U.S. Pat. No. 4,725,110, issued to W. H. Glenn, et al. on Feb. 16, 1988, and U.S. Pat. No. 4,807,950, issued to W. H. Glenn, et al. on Feb. 28, 1989. An optical fiber laser having a DBR-terminated cavity is described in G. A. Ball and W. W. Morey, "Continuously tunable single-mode erbium fiber laser", *Optics Lea.* 17 (1992) 420–422.

Bragg gratings are useful as passive optical components for other applications besides end-reflectors in fiber lasers. For example, Bragg gratings are useful as spectral filters for wavelength-division multiplexing and other optical signal-processing applications. An optical filter which comprises a Bragg grating formed in an optical fiber is described in U.S. Pat. No. 5,007,705, issued to W. W. Morey, et al. on Apr. 16, 1991.

We have observed that when a pair of intersecting laser beams is used to form a Bragg grating in an optical fiber, the resulting grating may exhibit certain optical properties that are generally undesirable. Specifically, the reflectivity spectrum of the grating may exhibit one or two relatively sharp subsidiary peaks, or a regularly spaced sequence of such peaks, to one side of the central peak, generally the short-wavelength side. (These subsidiary peaks are hereafter referred to as "fine structure".) This fine structure is undesirable, for example, in a feedback stabilization system in which the output wavelength of a laser is locked onto the central peak of a Bragg grating. If the grating has subsidiary peaks, it is possible for the tuning of the laser to shift to a subsidiary peak in response to an environmental disturbance. Thus, the presence of fine structure may make a laser system of this kind less robust against environmental disturbances.

By way of illustration, FIG. 1 shows an experimentally measured transmissivity spectrum of a typical Bragg grating formed in an optical fiber. (In the absence of loss, the sum of transmissivity and reflectivity is 100%.) The spectrum includes a broad main peak 10 and a series of subsidiary peaks 15.

We attribute this fine sideband structure to interference effects related to the average axial profile of the refractive index in the grating region. (By the "axial" direction is meant the propagation direction of electromagnetic radiation in the grating.) That is, the refractive index of the fiber (or other waveguiding medium) in the grating region is conveniently described in terms of a perturbation $\delta(z)$ which represents the difference between this index and the refractive index of the unexposed fiber, and in terms of the variation of the perturbation along the axial direction (i.e., the z-direction). The perturbation varies periodically, in step with the successive light and dark fringes in the interference pattern that created it. However, each of the interfering beams has a spatially varying intensity profile in the plane perpendicular to the propagation direction of the beam. This profile is typically Gaussian in shape. The intensity profiles of the interfering beams define the spatial extent of the Bragg grating, and modulate the amplitude of the periodic refractive index perturbation. As a result, the perturbation $\delta(z)$ generally takes the form of a periodic series of peaks enclosed by an envelope, typically Gaussian in shape, which is maximal at or near the center of the grating, and falls off to zero at the edges of the grating. If the perturbation is averaged over an axial distance much larger than the grating period, e.g., over ten or more periods, then the resulting average perturbation will of course have the same shape as this envelope.

The existence of such envelopes is well known. In fact, it is well known that an envelope having, e.g., a rectangular shape will give rise to side lobes in the resulting reflectivity spectrum. (See, e.g., H. Kogelnik, "Filter Response of Nonuniform Almost-Periodic Structures", *The Bell System Technical Journal* 55 (1976) 109–126.) However, the basic reason for this effect is that the grating has a limited spatial extent. By contrast, the fine structure discussed above is a consequence of the spatially averaged perturbation. This average perturbation is effective in certain respects as a "background" perturbation, which has physical significance separate from that of the rapid modulations (i.e., the "lines") of the grating. Until now, a full discussion of the effects of the average perturbation on spectral structure has not appeared in the relevant technical literature. In particular, practitioners in the an have hitherto failed to address possible techniques for mitigating (or for enhancing) the resulting fine structure.

It will be noted that fine structure will ordinarily not be resolved on a conventional optical spectrum analyzer. Such analyzers typically have a resolution, at best, on the order of 1 angstrom. Thus, conventionally measured spectra often fail to illustrate fine structure which is nonetheless present in the waveguide.

In order to accurately resolve fine structure, it is often necessary to employ a high resolution measurement technique such as a tunable external cavity semiconductor laser and power detector which can be stepped in wavelength increments significantly smaller than 1 angstrom, on the order of tenths of angstroms or less. Such a technique can be performed with an HP external cavity tunable laser source model #8168A.

SUMMARY OF THE INVENTION

We have succeeded in demonstrating, by computer simulations, that if the profile of the average refractive index perturbation $\delta_{ave}(z)$ is approximately pulse shaped in some portion of the Bragg grating, the grating may behave as a resonant cavity with respect to certain wavelengths of light (The term "light" is used herein to refer to radiation in the ultraviolet, visible, and infrared regions of the electromagnetic spectrum.) Interference within this cavity, akin to Fabry-Perot resonance, can account for the sidebands, or fine structure, that we have observed in laboratory experiments. We have furthermore found a method for mitigating or enhancing this fine structure.

Accordingly, the invention in one embodiment involves a method for forming a Bragg grating (also referred to as a distributed Bragg reflector, or "DBR") in a photosensitive optical medium. The DBR will exhibit a reflectivity spectrum that includes a main peak which has a measurable amplitude. The DBR comprises a material region of the body in which the refractive index is the sum of an initial refractive index and at least a first, spatially periodic or quasiperiodic, refractive index perturbation. (An example of a quasiperiodic grating is a grating whose period varies linearly with position, i.e., a so-called "linearly chirped" grating.) This sum has at least one vacuum Bragg wavelength, i.e., a vacuum wavelength of electromagnetic radiation that satisfies the Bragg condition in at least a portion of the DBR and as a result is relatively strongly reflected by the DBR.

The method includes the step of producing two non-collinear beams of electromagnetic radiation having an actinic wavelength. Each of these beams will typically have, in cross section, a Gaussian intensity profile. More generally, each beam will have an intensity profile that includes, along the beam diameter, at least one rising portion and at least one falling portion. The two beams are impinged on at least a portion of the medium, such that an interference pattern is created on the impinged portion, resulting in the first perturbation in the impinged portion.

As a result of this actinic exposure, the impinged portion acquires a background refractive index that is defined by summing the initial index and the first perturbation and spatially averaging the sum over at least ten DBR periods or quasiperiods. In general, this background index will vary with position along the impinged portion such that it has rising and falling portions corresponding to the rising and falling portions of the beam intensity profiles. At any point within the impinged portion, the vacuum Bragg wavelength will generally be dependent on the background index at that point.

The impinged portion will generally include at least one segment, to be referred to as a "resonant segment", that has first and second ends such that the background index is rising at the first end and falling at the second end. Each resonant segment has the further property that, in the absence of any refractive index perturbation other than the first perturbation described above, there is at least one vacuum wavelength of electromagnetic radiation that satisfies the Bragg condition at the first and second ends, but fails the Bragg condition in a region intermediate the first and second ends. The resonant segments will generally contribute subsidiary peaks to the reflectivity spectrum of the DBR.

In contrast to methods of the prior art, the inventive method in one embodiment further comprises, before or after the impinging step, the step of causing a second refractive index perturbation in at least part of the impinged portion, such that the subsidiary peaks are modified. In alternate embodiments of the invention, the subsidiary peaks are suppressed or enhanced.

An alternate embodiment of the invention involves a step that is alternative to, or in addition to, the second perturbing step. This alternate embodiment includes, during the impinging step, the step of varying the period of the perturbation with axial position, such that the subsidiary peaks are suppressed or enhanced.

In a further aspect of the present invention, a device for transmitting radiation is formed. The device includes a glass optical waveguide having a core. A Bragg grating is at least partially formed within the core. Associated with the Bragg grating is a transmission spectrum that includes a band in which incident radiation is attenuated, the peak attenuation being at a wavelength $\lambda$.

The transmission spectrum of the Bragg grating is such that the full width at half maximum measured in transmission is greater than or equal to (1.5 nm/1558.5 nm) $\lambda$ and peak attenuation within the band is greater than or equal to 90%. Attenuation exceeds 50% of the peak attenuation everywhere within the full width at half maximum of the transmission spectrum.

In another aspect, the present invention provides a device for transmitting radiation. The device includes a glass optical waveguide having a core with a Bragg grating formed in the waveguide. The reflectivity spectrum of the Bragg grating includes a band in which incident radiation is reflected. Reflection within the band is greater than 90% over at least 2 contiguous nanometers.

DETAILED DESCRIPTION OF A PREFERRED EMBODIMENT

Figure 2:
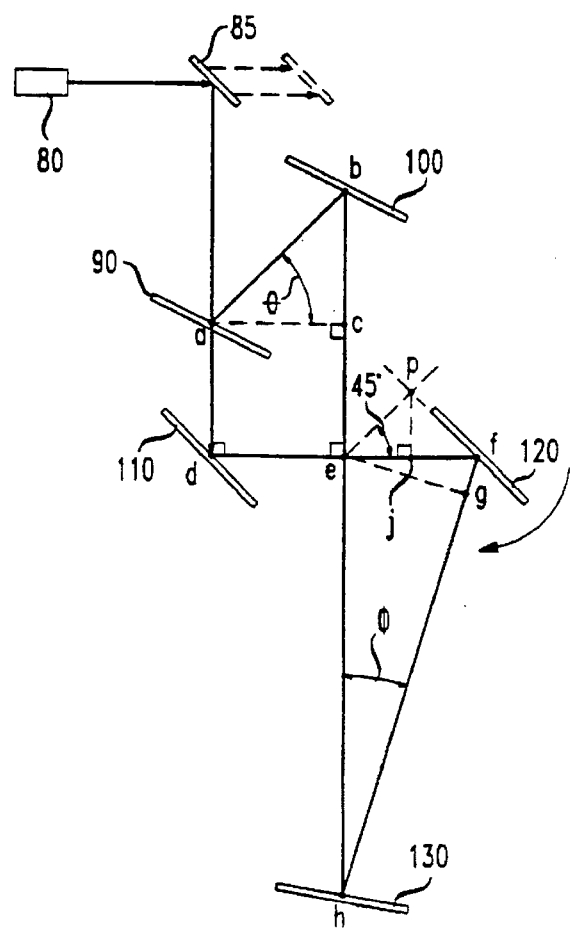
FIG. 2 is a schematic diagram showing the optical arrangement of an exemplary interferometer of the prior art that is useful in practicing the inventive method.

We have found it advantageous to cream the interference pattern using a scanning interferometer of a design in which the translation of a single, translatable mirror can shift the position of the interference pattern along the fiber while preserving its registration. As a consequence, the fiber can optionally be kept stationary between respective exposure steps leading to the formation of multiple Bragg gratings. An exemplary such interferometer is described, e.g., in U.S. Pat. No. 4,093,338, issued to G. C. Bjorklund, et al. on Jun. 6, 1978. The optical arrangement of the exemplary interferometer is illustrated in FIG. 2. Such an optical arrangement includes laser source 80, translatable mirror 85, rotatable mirror 120, and mirrors 90, 100, and 110. The interfering beams converge on photosensitive optical medium 130, which is exemplarily an optical fiber. The interference pattern can be shifted (without affecting its phase) along the fiber by translating mirror 85. In general, the periodicity of an interference pattern can be changed by adjusting the angle of intersection φ of the interfering beams. In the exemplary interferometer, this is achieved, without changing the path-length difference between the interfering beams, by rotating mirror 120. A sequence of two or more gratings is readily formed on a single optical fiber by translating mirror 85 and then exposing a new portion of the fiber.

According to a preferred method for making the Bragg gratings, the fiber is first clamped into position to assure that the regions to be exposed are straight. The fiber is subjected to an effective exposure of radiation, typically ultraviolet light. Various appropriate sources of ultraviolet light are available and known to those skilled in the art.

By way of illustration, we have found that an excimer-pumped, frequency doubled, tunable dye laser emitting at about 245 nm is an appropriate exposure source. We have described the use of such an exposure source in copending U.S. patent application Ser. No. 07/878791, filed on May 5, 1992 by D. J. DiGiovanni, et at., which we hereby incorporate by reference. As discussed therein, this exposure source is useful for making gratings in highly erbium-doped, silica-based optical fibers. These fibers are typically exposed to 2-mJ pulses at a repetition rate of 20 pulses per second. A cylindrical lens focuses the laser light into a band about 0.5 cm long and 100–200 μm wide. Typical exposures are about 30 seconds in duration. By that method, Bragg gratings are readily formed with, e.g., a constant period of about 0.5 μm.

The intensity profiles of the exemplary laser exposure sources described above are approximately Gaussian in shape. As a consequence, the refractive index perturbation in the resulting Bragg gratings appears as a periodic wave modulated by an envelope which is approximately Gaussian. (And of course the perturbation, averaged over many periods, has essentially the same shape as the envelope.) This is an example of an envelope which is at least partially pulse shaped. By "pulse shaped", we mean that as axial position is increased along some continuous segment of the grating, the refractive index of the core rises to a maximum value and subsequently falls to a lower value. (Fine structure would also be produced by a grating having a negatively pulse-shaped envelope; i.e., an envelope that falls to a minimum value, instead of a maximum value, near the center. Although such gratings are atypical, we intend to include them under the definition of gratings with pulse-shaped envelopes.)

Figure 3:
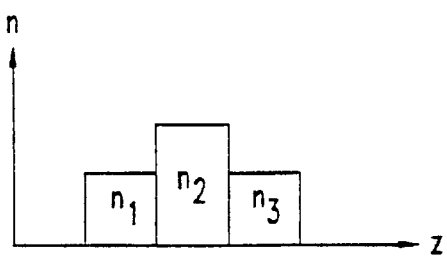
FIG. 3 is a simplified diagram illustrating the spatial variation of average refractive index in a typical Bragg grating formed in an optical medium.

We have found a simple conceptual model that helps, in a qualitative fashion, to explain the resonant behavior of a pulse-shaped perturbation. This model is explained with reference to FIG. 3. For certain wavelengths of light near the central peak of the Bragg grating, the average refractive index (i.e., the index averaged over many, e.g. 10, grating periods) in the grating is represented as three rectangular pulses having respective refractive indices $n_1$, $n_2$, and $n_3$, with $n_1 \approx n_3$, and $n_1 < n_2 > n_3$. The wavelength λ of light propagating within each pulse is related to the corresponding vacuum wavelength $\lambda_{vac}$ by $$\lambda = \frac{\lambda_{vac}}{n},$$

where n is the relevant refractive index.

For wavelengths near the center of the main reflectivity peak of the grating, the Bragg condition is satisfied in the central pan of the average refractive index profile (i.e., in the second pulse). However, some smaller wavelengths will satisfy the Bragg condition in the first and third pulses, but fail the Bragg condition in the central pulse. As a consequence, electromagnetic radiation of these wavelengths will be reflected in the first and third pulses. Within the second pulse, by contrast, this radiation will be freely propagating and non-reflected, and it will be at least partially confined between the two reflective end pulses. This defines a Fabry-Perot cavity. The reflectivity spectrum of such a grating will exhibit fine structure generally lying at wavelengths below the center of the main reflectivity peak. The peaks in this fine structure correspond to standing waves in the Fabry-Perot cavity.

According to a more detailed analysis, the Bragg grating has a design wavelength $\lambda_0$, which is the vacuum wavelength of peak reflectivity of an idealized grating having a given period and an average refractive index $n_0$ equal to that of the unperturbed core material. As the exposure of the grating to the interfering beams is increased in intensity or duration, the perturbation is increased without changing the period of the grating. As a consequence, the peak vacuum wavelength is changed from $\lambda_0$ to a different wavelength, given by $$\lambda_0 \left[ 1 + \frac{\delta_{ave}(z)}{n_0} \right].$$

Because increasing the exposure generally increases the refractive index, this detuning is generally toward longer vacuum wavelengths. Because of the intensity profiles of the interfering beams, this effect generally varies with axial position within the grating.

Figure 4:
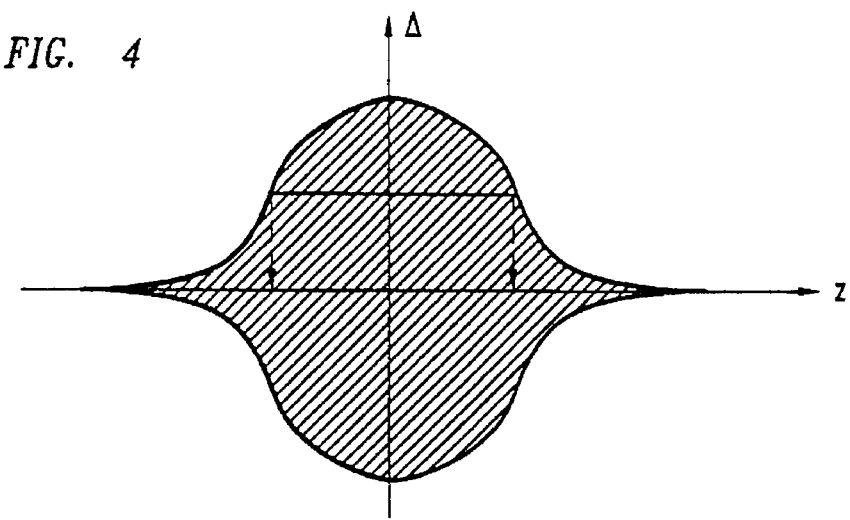
FIG. 4 is a simplified diagram illustrating the mechanism by which interference effects may arise in a Bragg grating having a pulse-shaped average refractive index profile.

An idealized grating is reflective with respect to $\lambda_0$ throughout the entire grating. (An equivalent way to state this is that light at the wavelength $\lambda_0$ will have an evanescent component over the entire length of the grating.) Assume now that the grating is stronger in the center than at the ends, but there is no detuning. In that case, vacuum wavelengths slightly higher or lower than $\lambda_0$ will be evanescent only in the central part of the grating, where the grating is strongest. This situation is depicted graphically in FIG. 4. The deviation of any given vacuum wavelength from $\lambda_0$ is measured along the vertical axis, labeled $\Delta$ in the figure. The axial coordinate is labeled z. Appearing as a shaded region in the figure is the locus of all points $(z,\Delta)$ at which the Bragg condition is satisfied. To determine what portion of the grating is reflective with respect to a given vacuum wavelength, a horizontal line is drawn at the corresponding value of $\Delta$. The intersection of the shaded region with the line is projected onto the z axis. This projection defines the axial extent of the reflective portion of the grating.

Figure 5:
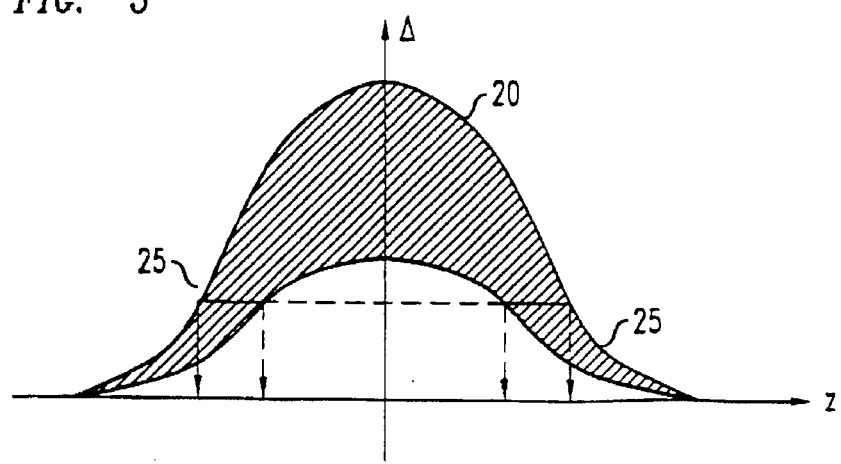
FIG. 5 is a simplified diagram further illustrating the mechanism by which interference effects may arise in a Bragg grating having a pulse-shaped average refractive index profile.

The effect of detuning is now discussed with reference to FIG. 5. Assume that (as is usual) the detuning of the grating is toward longer vacuum wavelengths. Because the grating is now most efficient for some wavelength longer than $\lambda_0$, the detuning shifts the entire shaded region toward longer wavelengths and shifts the main reflectivity peak from $\lambda_0$ to a longer vacuum wavelength $\lambda_1$. However, if the interfering beams have a pulse-shaped profile, the detuning is stronger in the center than at the ends of the grating. This causes the central portion 20 of the shaded region to shift more than the end portions 25. As a consequence, there may be some range of wavelengths shorter than $\lambda_1$ that are reflected by the weaker, but less detuned, end portions of the grating, but are not reflected by the stronger, but more detuned, central portion. With respect to these wavelengths, the central potion may behave like a resonant cavity, in analogy to the central pulse of the conceptual model discussed above. In the same analogy, the reflective end portions 25, hereafter "wings", correspond to the two pulses bounding the central pulse. This situation is depicted graphically in FIG. 5.

As noted, the detuning of any portion of the grating can be increased by increasing the exposure of that portion to the index-modifying radiation. As the detuning increases, the corresponding portion of the shaded area of FIG. 5 shifts toward longer wavelengths. It is apparent from the figure that a resonant cavity can be avoided by shifting at least one of the wings 25 toward higher wavelengths, such that it will no longer reflect the light that otherwise resonates in the central portion of the grating. This shift is readily produced by impinging a beam of actinic radiation, from a single, non-interfering beam, on the grating. This index-modifying beam is displaced from the center of the grating. The changes in the fine structure resulting from such treatment are readily observed, and can even be monitored during the treatment. The treatment can be terminated when the fine, structure is reduced to an acceptable level.

Figure 1:
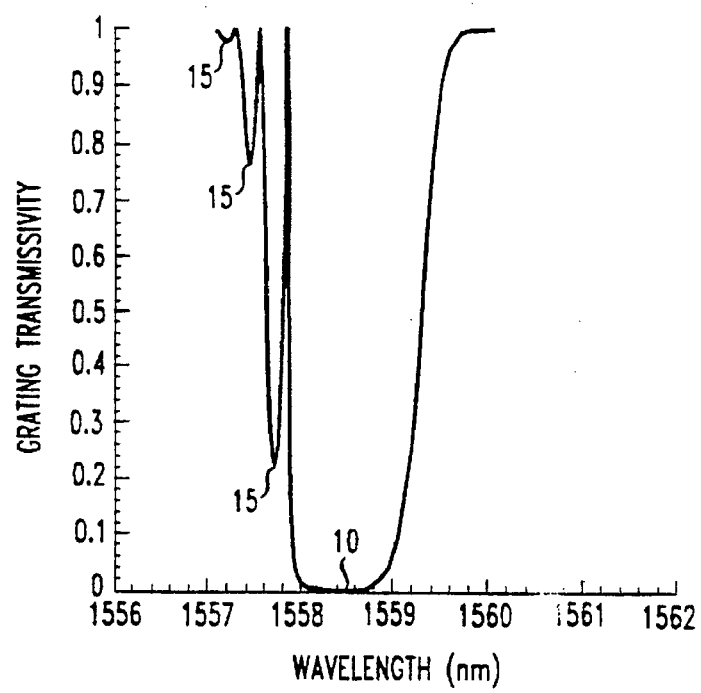
FIG. 1 is a transmissivity spectrum, generated by computational simulation, of a typical Bragg grating formed in an optical fiber.
Figure 6:
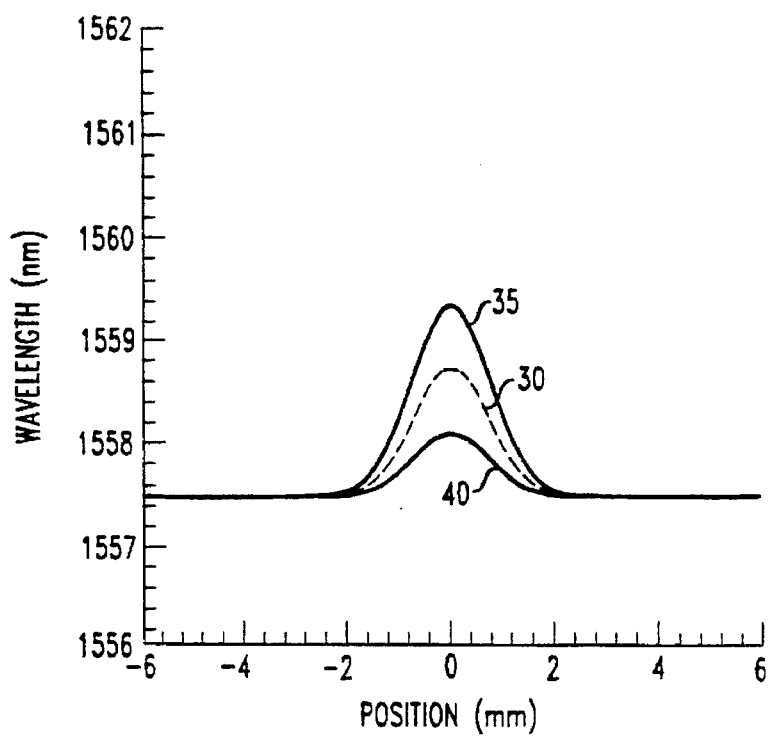
FIG. 6 is a refractive index profile, generated by computational simulation, of the Bragg grating of FIG. 1. The average refractive index perturbation is expressed, in this figure as well as in FIGS. 7 and 8, in terms of vacuum wavelength. Also shown are the upper and lower bounds on the vacuum wavelength for which the grating, at a given point, is reflective.

An exemplary non-interfering, index-modifying exposure is illustrated in FIGS. 6–9. The unmodified grating is the grating that yielded (in computational simulations) the spectrum of FIG. 1. This grating has a design wavelength of 1557.45 nm, a peak index change, due to actinic exposure, of 0.08%, and a full width at half maximum of 1.75 nm. It is formed in a lossless optical fiber having a cladding refractive index of 1.45. FIG. 6 shows the refractive index profile of the unmodified grating. The refractive index is expressed in terms of the corresponding vacuum Bragg wavelength, as explained above. In the figure, curve 30 represents the spatially averaged refractive index, and curves 35 and 40 represent, respectively, the highest and lowest wavelengths that will be reflected in the grating.

Figure 7:
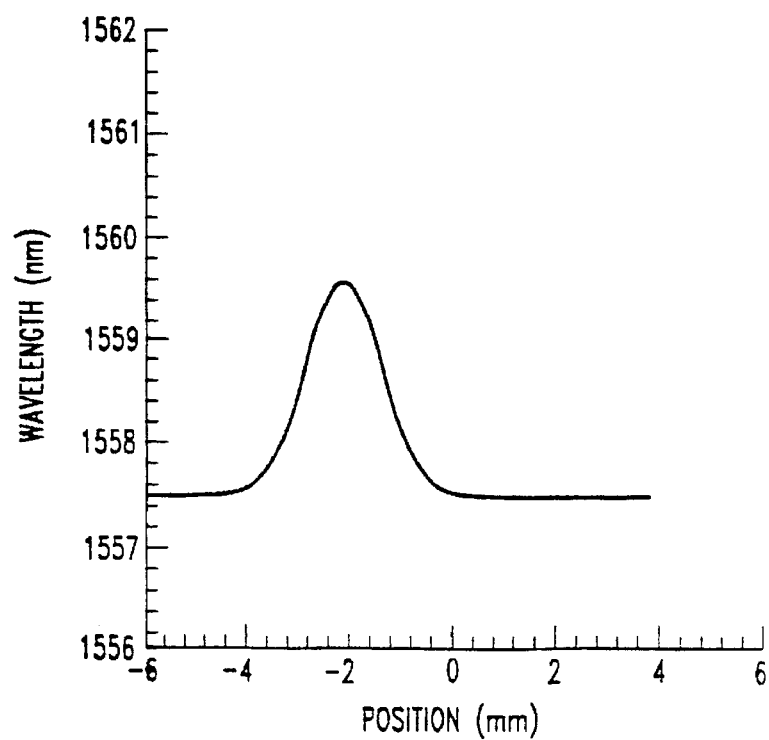
FIG. 7 is a profile, generated by computational simulation, of the refractive index perturbation produced by an exemplary index-modifying exposure, according to the invention in one embodiment.
Figure 8:
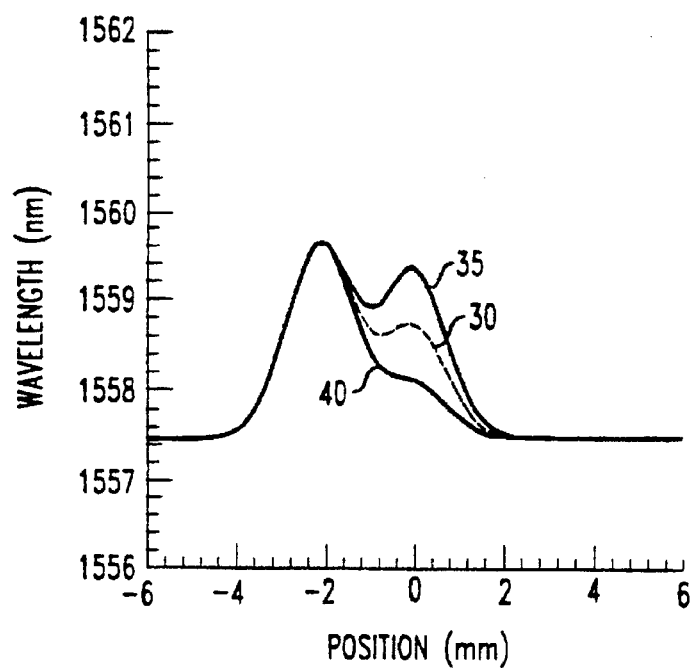
FIG. 8 is the refractive index profile, generated by computational simulation, of the Bragg grating of FIG. 6, after being subjected to the index-modifying exposure of FIG. 7.

The index-modifying exposure is described by FIG. 7. The actinic beam has a Gaussian profile having the same spatial extent as the unmodified grating. The center of the index-modifying beam is displaced to the position where the profile of FIG. 6 falls to $e^{-2}$ times its peak value. The (simulated) beam profile of FIG. 7 is expressed as the the total refractive index profile (in terms of equivalent vacuum wavelength) that this exposure would produce in the pristine, photosensitive medium. FIG. 8 is the simulated refractive index profile of same grating after modification by the exposure of FIG. 7. With reference to the region between curves 35 and 40, it is apparent that the right-hand wing of FIG. 6 is eliminated, and the left-hand wing is reduced to a very narrow region that will contribute little or no fine structure.

Figure 9:
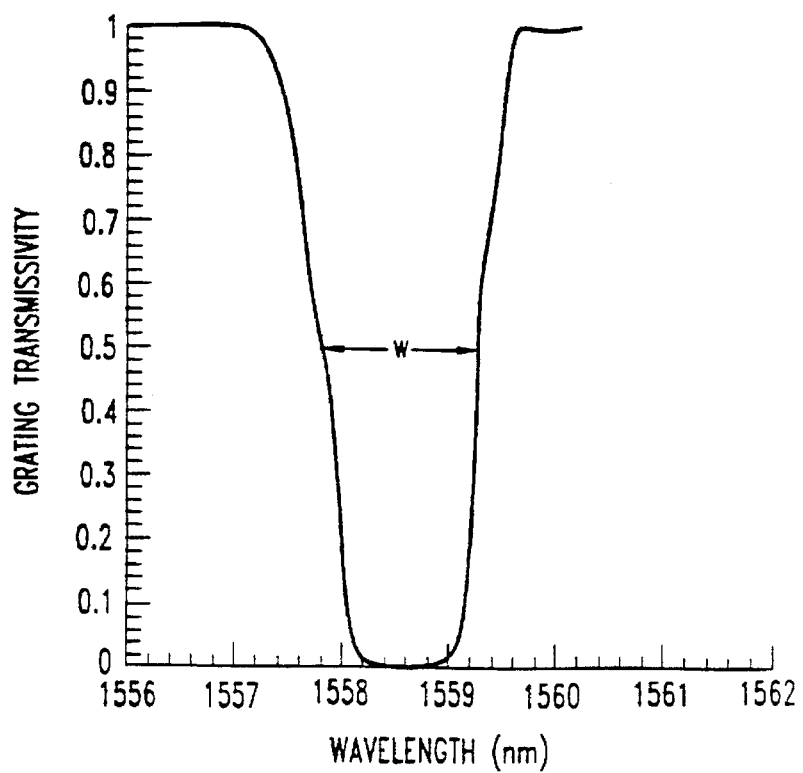
FIG. 9 is the transmissivity spectrum, generated by computational simulation, of the modified Bragg grating of FIG. 8.

FIG. 9 is the transmissivity spectrum of the modified grating. It is evident that the resolved subsidiary peaks 15 of FIG. 1 have been eliminated.

The transmissivity spectrum of the grating of FIG. 9 shows an attenuation band. Attenuation, in its broadest sense, denotes radiation which is not transmitted through the waveguide. Such radiation may be reflected or escape through the waveguide. The attenuation band of FIG. 9 has a full width at half maximum on the order of 1.5 nm (illustrated as "w" in the FIG.) and a peak attenuation at about 1558.5 nm. Because of the absence of fine structure, the attenuation exceeds 50% of the peak attenuation everywhere within the full width at half maximum. That is, there are no subsidiary peaks having high transmission. Such a grating is said to be substantially "free of holes" since it does not substantially transmit radiation within the attenuation band.

The peak attenuation of the Bragg grating is greater than 90%. Preferably, the peak attenuation is greater than 95%, with peak attenuations of 98% and 99% being exemplary.

Figure 13:
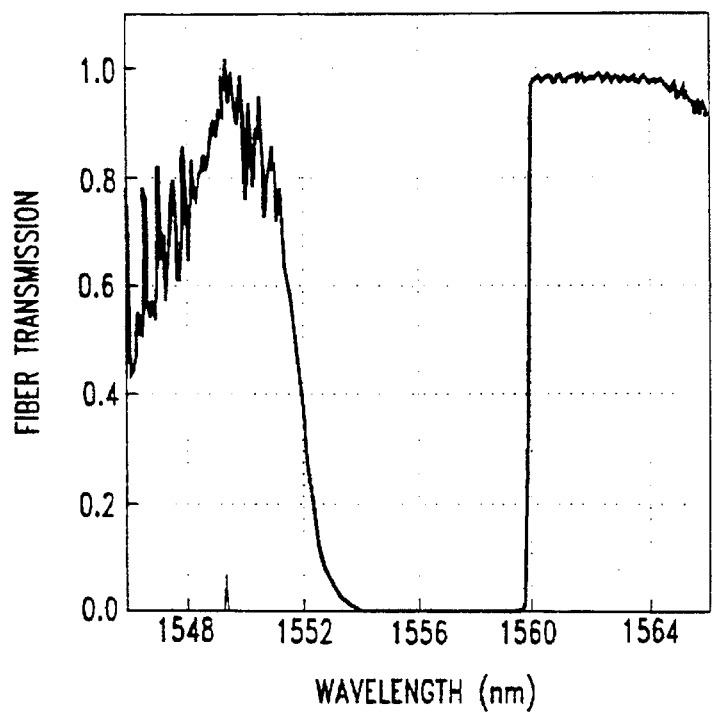
FIG. 13 is a transmissivity spectrum of a Bragg grating having a full width at half maximum on the order of 8 nm.
Figure 14:
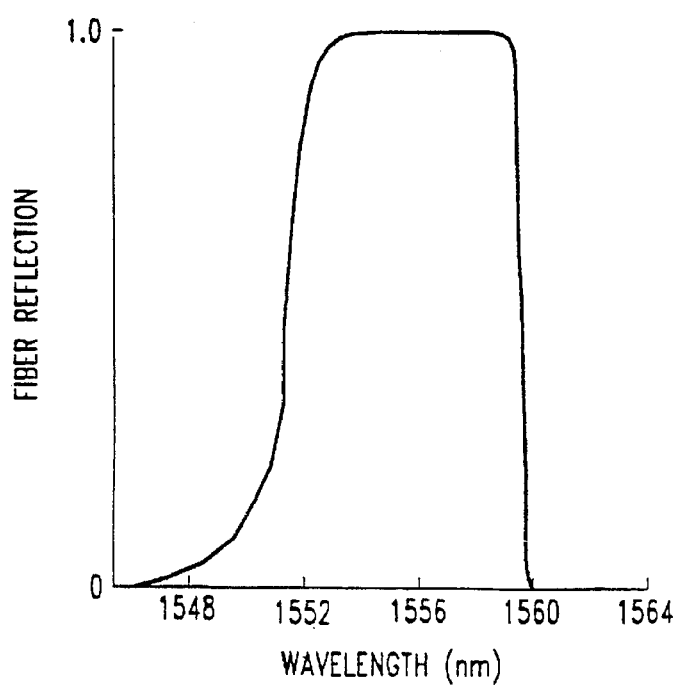
FIG. 14 is a schematic representation of a reflectivity spectrum of the Bragg grating of FIG. 13.

FIG. 13 illustrates a transmissivity spectrum for a linearly chirped grating formed with approximately 4.8 nm per cm linear chip rate. An exemplary grating is at least partially formed within the core of an optical waveguide but the invention is not limiting to gratings within the core. FIG. 14 is a schematic of the reflectivity spectrum for the grating of FIG. 13. The spectrum includes a band in which incident radiation is reflected back down the waveguide core. The reflection within the band is greater than 90% over at least 2 contiguous nanometers with reflection greater than 95%, 90%, or 99% being exemplary.

According to a further aspect of the present invention, a glass optical waveguide having a core with a Bragg grating at least partially formed within the core is formed. The Bragg grating has a transmission spectrum that includes a band in which incident radiation is attenuated. The transmission within the band is less than 5% over at least 3 contiguous nanometers.

The invention also relates to a glass optical waveguide having a core and a Bragg grating formed within the waveguide. The Bragg grating has a transmission spectrum that includes a band in which incident radiation is attenuated. The transmission within the band is less than 1% of the peak transmission over at least 2 contiguous nanometers. An exemplary waveguide is an optical fiber.

The index-modifying exposure is not limited to exposures having Gaussian profiles. We believe that various other kinds of spatially modulated exposure are also readily achieved, and in some cases may be desirable. For example, a ramp-shaped exposure can be achieved by scanning the grating region with a relatively narrow actinic beam. During the scanning, the average intensity of the beam is varied, exemplarily as a linear function of axial position. The average intensity of a continuous laser beam is readily modulated by, e.g., varying the input power to the laser. The average intensity of a pulsed laser beam is readily modulated by, e.g., varying the pulse repetition rate.

Figure 10:
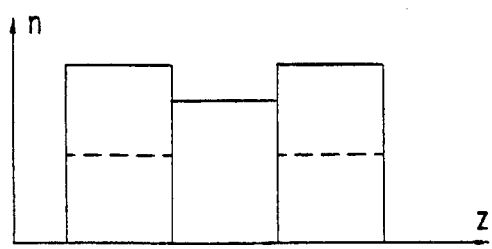
FIG. 10 is a simplified diagram illustrating the modification of the interference effects of FIG. 5 such that the resulting sidebands are inverted relative to the central reflectivity peak. According to the invention in one embodiment, this modification is achieved by modulating the average refractive index.

As noted, the fine structure typically appears at wavelengths below the center of the main reflectivity peak of the grating. In some cases, it may be desirable to shift this structure to wavelengths above the center of the main peak, rather than to eliminate it. With reference to the simplified model of FIG. 3, the position of the fine structure can be inverted relative to the main peak by inverting the first pulse and the third pulse relative to the second pulse. That is, a single, non-interfering beam can be used to selectively expose the regions of the first and third pulses such that the average refractive index is made larger in these regions than in the central region. This result is shown in FIG. 10. As a consequence of this treatment, the vacuum wavelength that satisfies the Bragg condition will be greater for the first and third pulses than for the second pulse. Thus, there will be some wavelengths above the center of the main reflection peak that are reflected in the side pulses but not in the central pulse.

It should be noted that the index-modifying exposures discussed above may decrease the strength of the exposed portion of the grating. Thus, there will be a practical limit on the maximum index change that can be attained.

An alternative method for modifying the refractive index is to heat the grating. We have observed that in at least some photosensitive glasses, heating of the Bragg grating tends to erase the grating; i.e., to decrease the amplitude of the refractive index perturbation. Accordingly, results similar to those described above can be achieved by employing localized heating to modulate the average refractive index of the grating. Such localized heating is readily achieved by impinging a beam from an infrared laser, such as a carbon dioxide laser, on the photosensitive medium. This beam is optionally displaced along the medium during the exposure. Various other methods of localized heating are also possible, such as heating from the nearby tip of a heated needle-like probe.

A second way to eliminate, enhance, or invert the fine structure is to modulate the grating period. This technique may be practiced instead of, or in addition to, the technique of modulating the average refractive index. According to this second technique, the vacuum wavelength that satisfies the Bragg condition in a given region is increased by increasing the grating period in that region, and decreased by correspondingly decreasing the grating period. The fine structure can be eliminated by increasing the grating period on one side of the grating. This is achieved, for example, by forming a grating whose period varies linearly with axial position (i.e., a linearly chirped grating). It is well known that a chirped grating can be formed in photosensitive material by impinging thereupon a pair of interfering, non-collinear, converging, actinic beams. Because the beams converge, the effective intersection angle is dependent upon position. The local grating period varies according to variations of the intersection angle. The effect of such a modulation on the spectral behavior of the grating will be qualitatively similar to the effect of adding a linearly varying refractive index perturbation. Indeed, it will be readily apparent to the skilled practitioner that modulations of the grating period will produce numerous effects analogous to those produced by modulating the average refractive index.

A preferred method for producing a chirped grating involves the use of the interferometer of FIG. 2, and is described in the co-pending U.S. patent application filed by V. Mizrahi et at. under the title "Method for Forming Spatially-Varying Distributed Bragg Reflectors in Optical Media." This application has issued as U.S. Pat. No. 5,363,239. Briefly, a tunable source of actinic radiation is used, and the actinic wavelength is varied during the exposure while, at the same time, the interference pattern is displaced along the photosensitive medium. Alternatively, the actinic wavelength is held constant and the intersection angle of the actinic beams is varied. This is achieved by substituting a curved mirror for one of the fixed, planar mirrors of the interferometric optical system, and displacing the interference pattern during the exposure.

Figure 11:
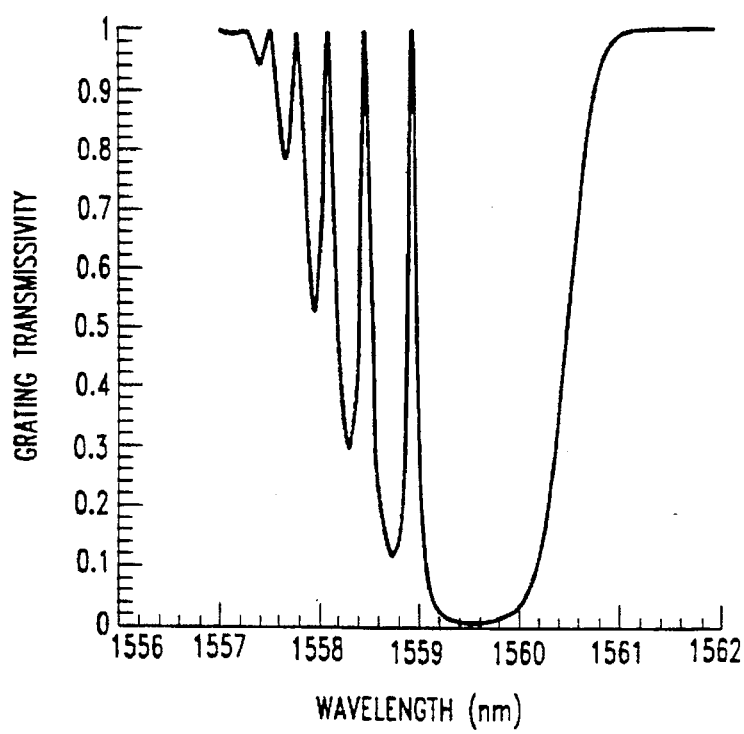
FIG. 11 is a transmissivity spectrum, generated by computational simulation, of the Bragg grating of FIG. 6 after an index-modifying exposure for enhancing the fine structure, according to the invention in one embodiment.

In some cases, it may actually be desirable to enhance the fine structure, rather than to mitigate it. For example, it is possible to produce a very sharp central peak in the grating reflectivity spectrum by superimposing fine structure that is very pronounced. This may be useful in applications where an extremely sharp spectral peak is desirable, and the presence of neighboring peaks can be tolerated. The fine structure may be enhanced by further detuning a selected central portion of the grating. Such further detuning can be performed by impinging a single, actinic beam on the selected grating portion. For example, the grating may be exposed by a centered beam having a Gaussian profile of the same spatial extent as the unmodified grating. The simulated transmissivity spectrum of the grating of FIG. 6 after such an exposure is shown in FIG. 11. As will be evident from the preceding discussion, similar results can be achieved by spatially modulating the grating period.

Figure 12:
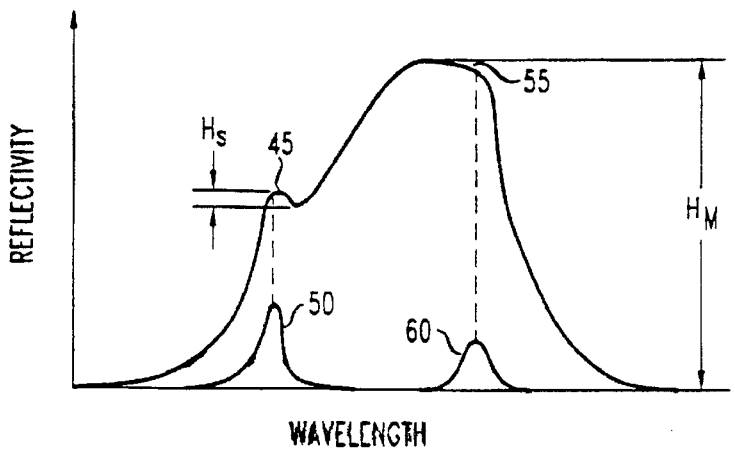
FIG. 12 is a reflectivity spectrum of a hypothetical Bragg grating, illustrating the tendency of some subsidiary peaks to broaden the main peak, and the tendency of other subsidiary peaks to add roughness to the side of the main peak.

In some cases, the fine structure of an unmodified grating will add roughness to the main peak by superimposing one or more well-resolved subsidiary peaks on the slowly varying background contributed by the side of the main peak. Such a situation is schematically depicted in FIG. 12, where subsidiary peak 45 (shown, fully resolved, as curve 50) adds roughness to the spectrum, whereas subsidiary peak 55 (shown, fully resolved, as curve 60) merely broadens the main peak without substantially roughening it. When, e.g., a laser is locked onto the central peak of a Bragg grating by feedback stabilization, roughness is undesirable because it increases ambiguity about the peak location and increases the likelihood that the tuning of the amplifier will jump to the subsidiary peak. Accordingly, one application of the inventive method is to reduce the roughness added by the fine structure. One way to quantify the roughness is to express it in terms of the height of the subsidiary peak above the slowly varying background. This height is desirably normalized to the height of the maim peak. Accordingly, the roughness corresponding to feature 45 of FIG. 12 may be expressed as the ratio $$\frac{H_S}{H_M}.$$

For purposes such as tuning of an amplifier, the grating is desirably modified such that the maximum roughness added by any subsidiary peak is less than 10%.

We claim:

1. Device for transmitting radiation comprising: a length of glass optical waveguide having a core and an axial coordinate z, said length comprising a portion having a core refractive index perturbation δ(z) that varies as a function of z, wherein $\delta(z)$ is effective for providing in said portion; a Bragg grating having a transmission spectrum that includes a wavelength band in which incident radiation is attenuated, with peak attenuation being at a wavelength $\lambda$;

said wavelength band having a full width at half maximum, measured in transmission, that is greater than or equal to (1.5 nm/1558.5 nm) $\lambda$, and peak attenuation within the wavelength band is greater than or equal to 90%;

wherein attenuation exceeds 50% of the peak attenuation everywhere within the full width at half maximum.

2. The device of claim 1 wherein said waveguide is an optical fiber.

3. The device of claim 1 wherein the peak attenuation is greater than 95%.

4. The device of claim 1 wherein the peak attenuation is greater than 98%.

5. The device of claim 1 wherein the peak attenuation is greater than 99%.

6. Device for transmitting radiation comprising:

a length of glass optical waveguide having a core and an axial coordinate z, said length comprising a portion having a core refractive index perturbation $\delta(z)$ that varies as a function of z, wherein $\delta(z)$ is effective for providing in said portion a Bragg grating having a reflectivity spectrum that includes a wavelength band in which incident radiation is reflected;

wherein reflection within said wavelength band is greater than 90% over at least 2 contiguous nanometers of wavelength.

7. Device for transmitting radiation comprising:

a length of glass optical waveguide having a core and an axial coordinate z, said length comprising a portion having a core refractive index perturbation $\delta(z)$ that varies as a function of z, wherein $\delta(z)$ is effective for providing in said portion a Bragg grating having a transmission spectrum that includes a wavelength band in which incident radiation is attenuated;

wherein the transmission within said wavelength band is less than 5% over at least 3 contiguous nanometers in wavelength.

8. The device of claim 7 where the transmission within said wavelength band is less than 5% over at least 5 contiguous nanometers.

9. Device for transmitting radiation comprising: a length of glass optical waveguide having a core and an axial coordinate z, said length comprising a portion having a core refractive index perturbation $\delta(z)$ that varies as a function of z, wherein $\delta(z)$ is effective for providing in said portion a Bragg grating having a transmission spectrum that includes a wavelength band in which incident radiation is attenuated, wherein the transmission within said wavelength band is less than 1% of a peak transmission over at least 2 contiguous nanometers in wavelength.

10. Device of claim 9 wherein said waveguide is an optical fiber.

11. A spectrally selective optical waveguide, made by the method comprising:

a) providing a photosensitive, optically waveguiding glass body having at least one waveguiding axis; and b) forming in said body a first refractive index perturbation that defines a Bragg condition relative to light propagation parallel to the waveguiding axis, and that exhibits a reflectivity spectrum having a main peak relative to vacuum wavelengths of light that approximately satisfy the Bragg condition, wherein the forming step comprises the further steps of:

c) generating an interference pattern of actinic radiation having a spatially averaged intensity profile that includes at least one rising portion and at least one falling portion; and d) impinging the interference pattern on at least a portion of said body such that the interference pattern has at least a locally defined period along the waveguiding axis, and said intensity profile rises and falls along the waveguiding axis, the impinging step performed so as to lead to formation of the first refractive index perturbation; wherein:

e) the impinging step leads to a spatially-averaged, refractive-index profile in the first refractive index perturbation that has at least one rising portion and at least one falling portion along the waveguiding axis, and at least one segment, to be referred to as a resonant segment, included between the rising and falling portions, whereby, absent any further exposure to actinic radiation, the reflectivity spectrum comprises at least one subsidiary peak, CHARACTERIZED IN THAT the method further comprises:

f) producing a second refractive index perturbation in the body, resulting in a reduction of the amplitude of the subsidiary peak relative to the main peak, such that said reflectivity spectrum comprises a wavelength band wherein reflection is greater than 90% over at least 2 contiguous nanometers of wavelength.

12. A spectrally selective optical waveguide having a reflectivity spectrum, made by the method comprising:

a) providing a photosensitive, optically waveguiding glass body having at least one waveguiding axis; and b) forming in said body a first refractive index perturbation that defines a Bragg condition relative to light propagation parallel to the waveguiding axis, and that exhibits a reflectivity spectrum having a main peak relative to vacuum wavelengths of light that approximately satisfy the Bragg condition, wherein the forming step comprises the further steps of:

c) generating an interference pattern of actinic radiation having a spatially averaged intensity profile that includes at least one rising portion and at least one falling portion; and d) impinging the interference pattern on at least a portion of said body such that the interference pattern has at least a locally defined period along the waveguiding axis, and said intensity profile rises and falls along the waveguiding axis, the impinging step performed so as to lead to formation of the first refractive index perturbation; wherein:

e) the impinging step leads to a spatially-averaged, refractive-index profile in the first refractive index perturbation that has at least one rising portion and at least one falling portion along the waveguiding axis, and at least one segment, to be referred to as a resonant segment, included between the rising and falling portions;

CHARACTERIZED IN THAT the method further comprises:

f) during (d), causing the period to vary approximately linearly along the waveguiding axis, such that the resonant segment will not support substantial Fabry-Perot resonances, such that said reflectivity spectrum comprises a wavelength band wherein reflection is greater than 90% over at least 2 contiguous nanometers of wavelength.

* * * * *